US012513444B2

(12) United States Patent
Yoshino

(10) Patent No.: US 12,513,444 B2
(45) Date of Patent: Dec. 30, 2025

(54) MICROPHONE FIXING DEVICE

(71) Applicant: AUDIO TECHNICA CORPORATION, Machida (JP)

(72) Inventor: Satoshi Yoshino, Machida (JP)

(73) Assignee: AUDIO TECHNICA CORPORATION, Machida (JP)

( * ) Notice: Subject to any disclaimer, the term of this patent is extended or adjusted under 35 U.S.C. 154(b) by 168 days.

(21) Appl. No.: 18/611,090

(22) Filed: Mar. 20, 2024

(65) Prior Publication Data

US 2024/0388830 A1 Nov. 21, 2024

(30) Foreign Application Priority Data

May 17, 2023 (JP) ................................ 2023-081299

(51) Int. Cl.
*H04R 1/08* (2006.01)

(52) U.S. Cl.
CPC .................................... *H04R 1/08* (2013.01)

(58) Field of Classification Search
CPC . H04R 1/02; H04R 1/08; H04R 1/105; H04R 2201/02; H04R 2201/021; H04R 2201/025
See application file for complete search history.

(56) References Cited

FOREIGN PATENT DOCUMENTS

JP 2008-270942 A 11/2008

*Primary Examiner* — Tuan D Nguyen
(74) *Attorney, Agent, or Firm* — HAUPTMAN HAM, LLP

(57) ABSTRACT

A microphone fixing device includes a support shaft inserted into a fitting hole of a base with the microphone attached to the top end, a spacer ring fitted into the lower end of the support shaft, and a nut screwed onto the support shaft to press the spacer ring to the lower surface of the base, a gap allowing a microphone cable to be inserted is provided between the support shaft and the fitting hole, the spacer ring includes a small diameter part entering into the gap and a large diameter part abutting a lower surface of the base, a cable drawing out groove is formed from the small diameter part to the large diameter part to draw out the microphone cable to the lower surface of the base, and the microphone is fixed to an upper surface of the base via the support shaft by fastening of the nut.

5 Claims, 5 Drawing Sheets

Fig.5（A）
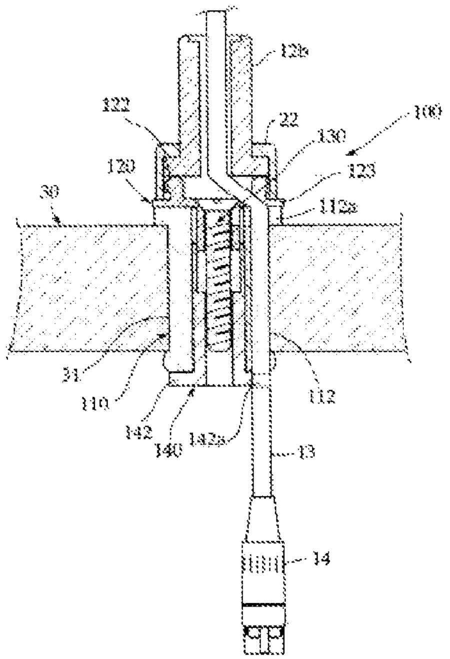
Fig.5（B）
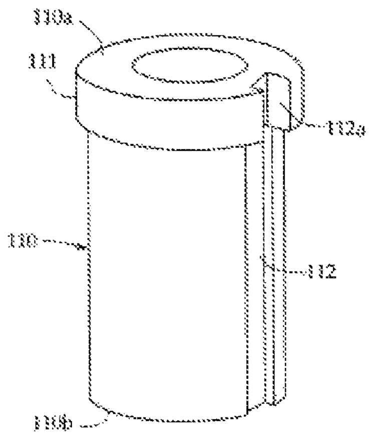

MICROPHONE FIXING DEVICE

RELATED APPLICATIONS

The present application is based on, and claims priority from, Japanese Application No. JP2023-081299 filed May 17, 2023, the disclosure of which is hereby incorporated by reference herein in its entirety.

BACKGROUND OF THE INVENTION

Field of the Invention

The present invention relates to a microphone fixing device, and in more detail, relates to a fixing device for a boundary microphone, a goose neck microphone or the like, which is used by being placed on a desk such as a conference table or podium.

Description of the Related Art

In many cases, a boundary microphone has a flat shape, and is used by being placed on a desk such as a conference table or podium. However, a sound collection direction may change when moved by a user or the like. Accordingly, fixing to a desk, which also includes the meaning of theft prevention, is performed. There are several fixing methods for this.

For example, there are methods for fixing a boundary microphone placed on a desk by a plurality of screws from the rear side of the desk. However, not only is it necessary to open a plurality of screw insertion holes on the desk, but it is also necessary to open a cable insertion hole separately from the screw insertion holes in the case where it is necessary to lead a microphone cable to the rear side of the desk. Moreover, according to this method, there may be cases where vibrations applied to the desk are transmitted to the screws and picked up by the microphone.

In contrast to this, there are methods that are resolved with one hole opened in a desk. As one example, with reference to FIGS. 5(A) and 5(B), Japanese Patent Laid-Open No. 2008-270942 describes a method, in a goose neck microphone erected on a base 30 such as a desk via a receiver 100, in which the receiver 100 includes a cylindrical receiver body 110 made from a rubber material having an upper end and lower end inserted into a fitting hole 31 to project from the base 30, a male screw 130 inserted into the receiver body 110 through a center hole of a washer plate 120 disposed on the upper end of the receiver body 110, and a female screw cylinder 140 that is inserted from a lower end side of the receiver body 110 and screwed onto the male screw 130, and the receiver body 110 is fixed in the fitting hole 31 by being compressed and expanded in an axial direction by the male screw 130 and the female screw cylinder 140.

Moreover, according to Japanese Patent Laid-Open No. 2008-270942, since the microphone cable 13 is drawn out to a lower surface (rear surface) side of the base 30, as shown in FIG. 5(B), a cable insertion groove 112 is formed along an axial direction on one portion of the receiver body 110 on an outer peripheral surface, and the microphone cable 13 is drawn out to the lower surface side of the base 30 in alignment with the cable insertion groove 112.

According to this, fixing of the microphone and leading of the microphone cable to the base lower surface side can be performed by simply opening the one fitting hole 31 in the base (desk) 30. However, since a thickness of the base 30 is irregular, it is necessary to prepare a receiver body having a shaft length that matches this thickness.

Moreover, in order to certainly prevent co-rotation when the male screw 130 is screwed into the female screw cylinder 140, it is necessary to have an outer diameter of the female screw cylinder 140 that is larger than an inner diameter of the receiver body 110, and to have the female screw cylinder 140 inserted into the receiver body 110 with a prescribed frictional force. This is a factor of worsening the workability.

Therefore, the problem of the present invention is to provide a microphone fixing device with good mounting workability, which can be applied to various types of bases, such as a desk, with different thicknesses, and in which a microphone cable with a connector can be drawn out to a rear surface side of a base as it is without being detached from a microphone.

SUMMARY OF THE INVENTION

In order to solve this problem, the present invention is a microphone fixing device for fixing a microphone having a microphone cable to an upper surface of a base such as a desk or podium,

- the microphone fixing device includes a support shaft, a spacer ring, and a nut,
- the support shaft is a shaft with a length thereof longer than a thickness of the base and having a male screw part on an outer periphery, the support shaft being inserted into a fitting hole bored into the base in a state where the microphone is attached to one end,
- the spacer ring is fitted into an outer periphery of the support shaft from a lower surface side of the base,
- the nut is screwed onto the male screw part from the other end side of the support shaft to press the spacer ring to a lower surface of the base,
- a gap allowing the microphone cable to be inserted is provided between the support shaft and the fitting hole,
- the spacer ring integrally includes a small diameter part entering into the gap and a large diameter part abutting the lower surface of the base, the large diameter part having a larger diameter than the fitting hole, and a cable drawing out groove is formed from an upper end of the small diameter part to the large diameter part, and
- the microphone cable is drawn out to the lower surface side of the base by passing through the gap and the cable drawing out groove, and the microphone is fixed to the upper surface of the base via the support shaft by fastening of the nut.

In the present invention, the spacer ring is preferably made from an elastic body.

Moreover, the present invention has a diameter of the microphone cable that is set to $\phi$, a depth of the cable drawing out groove in the large diameter part along an axial direction of the spacer ring that is set to d, a thickness of the large diameter part along an axial direction of the spacer ring that is set to t, and $\phi \leq d < t$.

According to a preferred aspect of the present invention, the support shaft has a D-cut surface on which one portion of the male screw part is cut out along an axial direction, and the cable drawing out groove is disposed at the D-cut surface.

Moreover, in the present invention, the microphone cable has one end side thereof directly attached to a built-in component of the microphone, the microphone cable integrally including a connector on the other end side, and the fitting hole has a size allowing the connector to be inserted.

According to the present invention, a microphone fixing device with good mounting workability is provided, which can be applied to various types of bases, such as a desk, with different thicknesses, and in which a microphone cable with a connector can be drawn out to a rear surface side of a base as it is without being detached from a microphone.

BRIEF DESCRIPTION OF THE DRAWINGS

FIGS. 4(A) to 4(C) shows a spacer ring included in the microphone fixing device, in which FIG. 4(A) is a perspective view, FIG. 4(B) is a front view, and FIG. 4(C) is a cross-sectional view taken from line C-C in the front view; and FIG. 5(A) is a perspective view showing a conventional example of a microphone fixing device, and FIG. 5(B) is a perspective view showing a receiver body used in the conventional example.

DETAILED DESCRIPTION OF THE PREFERRED EMBODIMENTS

Next, while an embodiment will be described to better understand the present invention, with reference to FIG. 1 to FIG. 4(C), the present invention is not limited to this embodiment.

Figure 1:
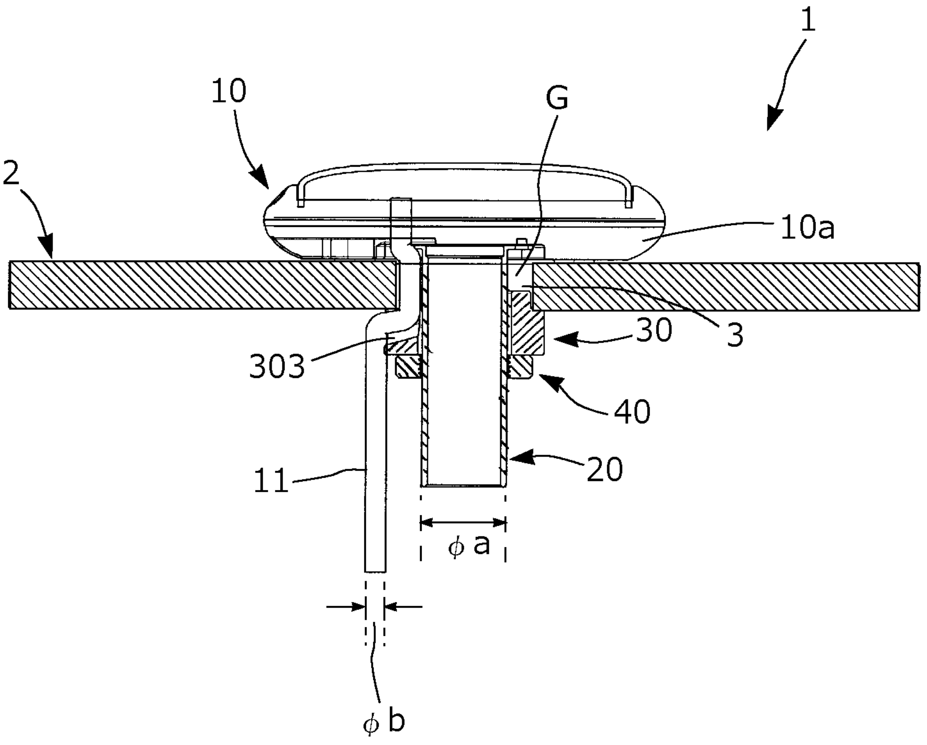
FIG. 1 is a cross-sectional view showing a usage state of a microphone fixing device of the present invention.
Figure 2:
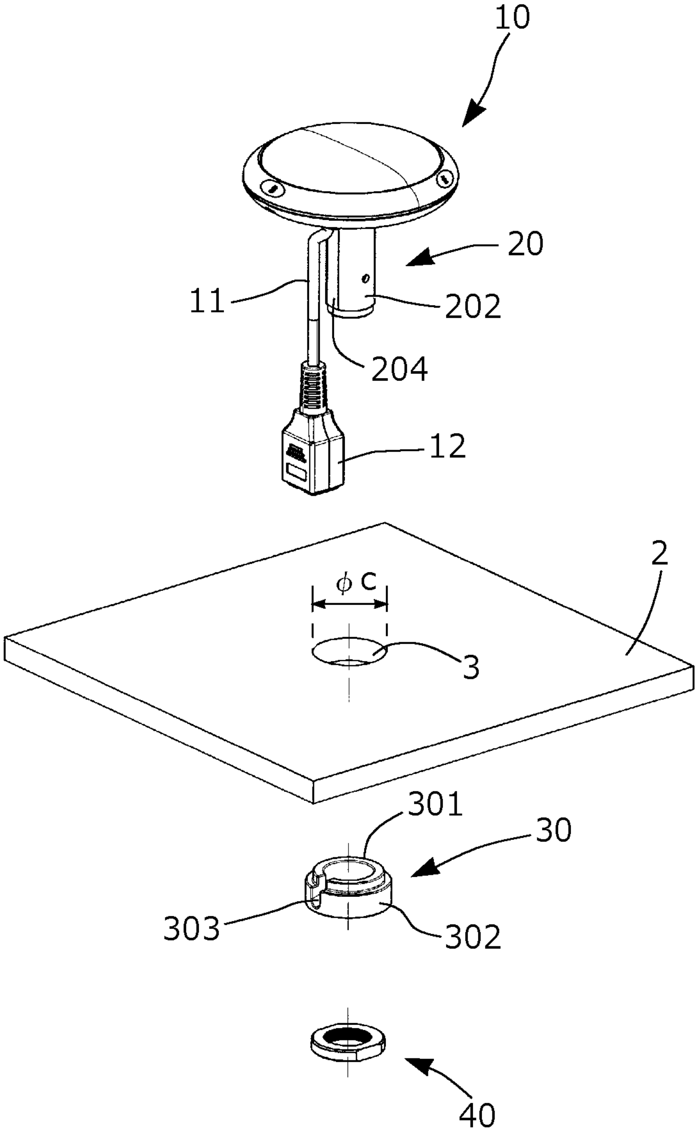
FIG. 2 is an exploded perspective view of FIG. 1.

First, with reference to FIG. 1 and FIG. 2, a microphone fixing device 1 includes a support shaft 20, a spacer ring 30, and a nut 40, as a basic configuration for fixing a microphone 10 to an upper surface of a base 2 such as a conference table or podium.

In the present embodiment, the microphone 10 is a boundary microphone having a flat shape, and a microphone cable 11 is drawn out from a bottom part thereof. The microphone cable 11 has one end thereof directly attached to a circuit board, for example, which is not illustrated, built into the microphone 10, and integrally includes an angular connector 12 connected to a microphone mixer, for example, which is not illustrated, at the other end side. The connector 12 may be round.

Note that while the microphone cable 11 may be freely attached/detached via a connector, which is not illustrated, with respect to the microphone 10, the thickness (height) of the microphone 10 increases only by the amount provided by this connector. Accordingly, in the present embodiment, since reducing the thickness (height) of the microphone 10 results in a flat shape, one end side of the microphone cable 11 is directly attached to the microphone 10, and not via a connector.

Figure 3:
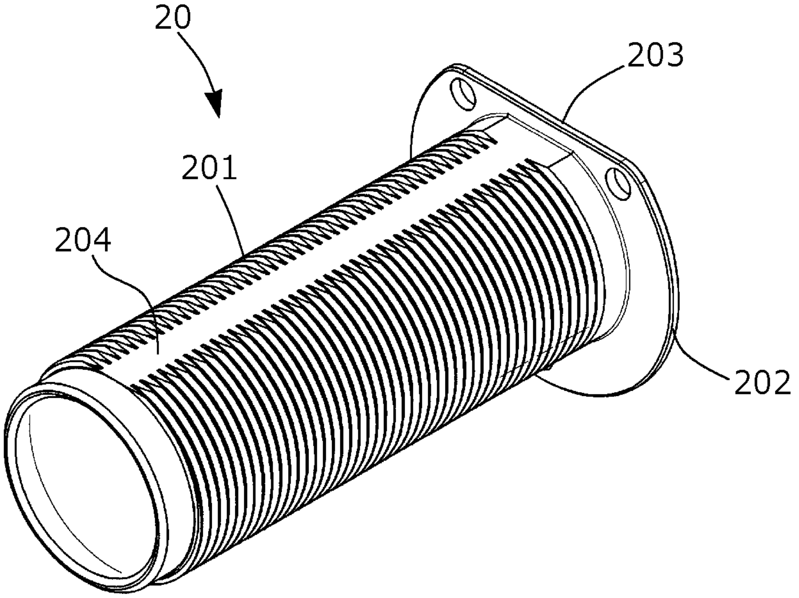
FIG. 3 is a perspective view showing a support shaft included in the microphone fixing device.
Figure 4:
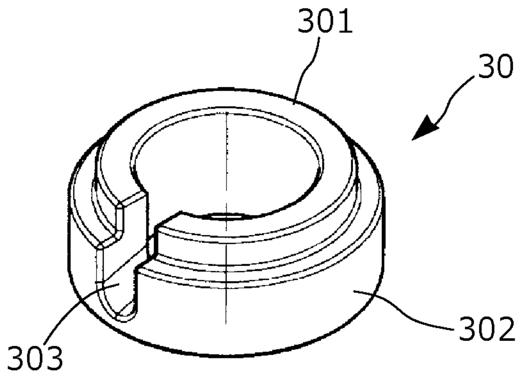
Figure 4:
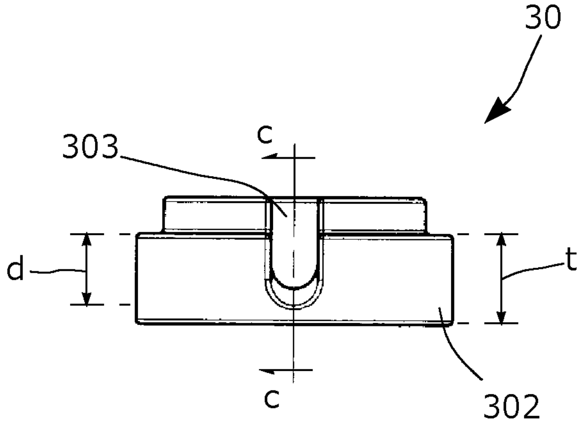
Figure 4:
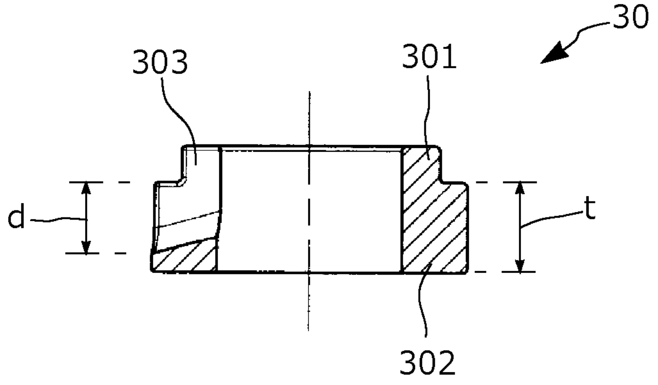

With reference also to FIG. 3, the support shaft 20 is a shaft made from a cylindrical body having a shaft length (length) longer than the thickness of the base 2, and a male screw part 201 is formed on the outer periphery thereof. The support shaft 20 may be a solid cylindrical body. The shaft length of the support shaft 20 is set to be sufficiently longer than a plate thickness of a normal conference table, so as to enable use for various types of bases 2. In the present embodiment, the shaft length of the support shaft 20 is 55 mm, and the outer diameter is 20 mm.

A flange part 202, which is attached to a rear cover 10*a* of the microphone 10 by a screw lock or the like, is formed on one end (upper end) side of the support shaft 20. A notch part 203 for making it easier to align the microphone cable 11 with a shaft body of the support shaft 20 (shaft portion where the male screw part 201 is formed) is formed on one portion of the flange part 202. The notch part 203 may have a groove shape. The support shaft 20 may be made from either synthetic resin or metal.

While the support shaft 20 is inserted into the fitting hole 3 bored into the base 2, a gap G allowing the microphone cable 11 to be inserted is provided between the support shaft 20 and the fitting hole 3. The fitting hole 3 has a size that can allow the connector 12 to pass through. As an example, an outer diameter of the support shaft 20 is set to $\phi a$, an outer diameter of the microphone cable 11 is set to $\phi b$, an inner diameter of the fitting hole 3 is set to $\phi c$, the support shaft 20 is coaxially inserted into the fitting hole 3, and the inner diameter $\phi c$ of the fitting hole 3 has a size of $\phi c \geq \phi a + 2 \times \phi b$.

According to the present embodiment, the support shaft 20 has a D-cut surface 204 on which one portion of the male screw part 201 is cut out almost flat along an axial direction, and as stated below, since the microphone cable 11 is disposed along the D-cut surface 204, a cutting margin depth of the D-cut surface 204 is set to t, and the inner diameter $\phi c$ of the fitting hole 3 may be $\phi c \geq \phi a + 2 \times \phi b - t$. As shown in FIG. 3, the D-cut surface 204 is provided at the same position as the notch part 203 formed on the flange part 202.

The spacer ring 30 is made from an elastic body such as a rubber material, and as shown in FIG. 1, is fitted into an outer periphery of the support shaft 20 from the lower surface side of the base 2. In the present embodiment, while the spacer ring 30 does not have a female screw for screwing with the male screw part 201, and is fitted into an outer periphery of the support shaft 20 with an appropriate frictional force, as another aspect, a female screw for screwing with the male screw part 201 may be formed on the spacer ring 30.

The spacer ring 30 includes a small diameter part 301, which enters into the gap G between the support shaft 20 and the fitting hole 3, and a large diameter part 302, which has a diameter larger than the fitting hole 3 and abuts the lower surface of the base 2. With reference also to FIG. 4(A) to FIG. 4(C), a cable drawing out groove 303 for drawing out the microphone cable 11 to the lower surface side of the base 2 is formed, from an upper end of the small diameter part 301 to the large diameter part 302, on the spacer ring 30.

An outer diameter of the microphone cable is set to b, a depth of the cable drawing out groove 303 in the large diameter part 302 along an axial direction the spacer ring 30 is set to d, a thickness of the large diameter part 302 along an axial direction of the spacer ring 30 is set to t, $\phi b \leq d < t$, and the cable drawing out groove 303 does not reach a lower end of the large diameter part 302. Namely, the spacer ring 30 is not notched in a C-shape by the cable drawing out groove 303 in a planar view.

The nut 40 is screwed onto the male screw part 201 from the other end (lower end) side of the support shaft 20 to press the large diameter part 302 of the spacer ring 30 to the lower surface of the base 2. The small diameter part 301 of the spacer ring 30 enters into the gap G between the support shaft 20 and the fitting hole 3 by tightening of the nut 40.

An example of the procedures to fix the microphone 10 to the base 2 will be described. First, as preparation work, a fitting hole 3 is bored into the base 2. The size of the fitting hole 3 is a size allowing the connector 12, which is attached to the microphone cable 11, to be inserted, and is a size in which an inner diameter $\phi c$ of the fitting hole 3, such as stated above, is $\phi c \geq \phi a + 2 \times \phi b$.

Next, the flange part 202 of the support shaft 20 is attached to the rear cover 10*a* of the microphone 10 by a screw lock or the like. At this time, the microphone cable 11 is fitted into a groove 203 formed on the flange part 202. Then, the connector 12 is drawn out to the lower surface side of the base 2 by passing through the fitting hole 3, and the support shaft 20 is inserted into the fitting hole 3 by aligning the microphone cable 11 with the D-cut surface 204.

Then, the spacer ring 30 is fitted into an outer periphery of the support shaft 20 from the lower surface side of the base 2. At this time, the cable drawing out groove 303 is positioned at the D-cut surface 204, and the microphone cable 11 passes through the cable drawing out groove 303 so that loosening does not occur.

Afterwards, the nut 40 is screwed onto the male screw part 201 from the other end side of the support shaft 20 to press the large diameter part 302 of the spacer ring 30 to the lower surface of the base 2. In this way, the small diameter part 301 of the spacer ring 30 enters into the gap G between the support shaft 20 and the fitting hole 3, and the microphone 10 is firmly fixed on the base 2 in a state where the microphone cable 11 is drawn out to the lower surface side of the base 2.

As described above, according to the present invention, a microphone fixing device with good mounting workability is provided, which can be applied to various types of bases, such as a desk, with different thicknesses, and in which a microphone cable with a connector can be drawn out to a rear surface side of a base as it is without being detached from a microphone.

Heretofore, while the present invention has been described by using an embodiment, the technical scope of the present invention is not limited to the description of the above embodiment. Changes or improvements added to the embodiment by a person skilled in the art are also included in the technical scope of the present invention.

What is claimed is:

1. A microphone fixing device for fixing a microphone having a microphone cable to an upper surface of a base such as a desk or podium, wherein the microphone fixing device comprises a support shaft, a spacer ring, and a nut, the support shaft is a shaft with a length thereof longer than a thickness of the base and having a male screw part on an outer periphery, the support shaft being inserted into a fitting hole bored into the base in a state where the microphone is attached to one end, the spacer ring is fitted into an outer periphery of the support shaft from a lower surface side of the base, the nut is screwed onto the male screw part from the other end side of the support shaft to press the spacer ring to a lower surface of the base, a gap allowing the microphone cable to be inserted is provided between the support shaft and the fitting hole, the spacer ring integrally comprises a small diameter part entering into the gap and a large diameter part abutting the lower surface of the base, the large diameter part having a larger diameter than the fitting hole, and a cable drawing out groove is formed from an upper end of the small diameter part to the large diameter part, and the microphone cable is drawn out to the lower surface side of the base by passing through the gap and the cable drawing out groove, and the microphone is fixed to the upper surface of the base via the support shaft by fastening of the nut.

2. The microphone fixing device according to claim 1, wherein the spacer ring is made from an elastic body.

3. The microphone fixing device according to claim 1, wherein a diameter of the microphone is set to $\phi b$, a depth of the cable drawing out groove in the large diameter part along an axial direction of the spacer ring is set to d, a thickness of the large diameter part along an axial direction of the spacer ring is set to t, and $\phi b \leq d < t$.

4. The microphone fixing device according to claim 1, wherein the support shaft has a D-cut surface on which one portion of the male screw part is cut out along an axial direction, and the cable drawing out groove is disposed at the D-cut surface.

5. The microphone fixing device according to claim 1, wherein the microphone cable has one end side thereof directly attached to a built-in component of the microphone, the microphone cable integrally comprising a connector on the other end side, and the fitting hole has a size allowing the connector to be inserted.

* * * * *